(12) United States Patent
De Greef

(10) Patent No.: US 9,740,000 B2
(45) Date of Patent: Aug. 22, 2017

(54) ELECTROWETTING DISPLAY DEVICE WITH SHAPED COLOUR FILTER

(71) Applicant: Amazon Technologies, Inc., Seattle, WA (US)

(72) Inventor: Petrus Maria De Greef, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 14/580,761

(22) Filed: Dec. 23, 2014

(65) Prior Publication Data

US 2016/0178891 A1 Jun. 23, 2016

(51) Int. Cl.
G02B 26/00 (2006.01)
G02B 5/20 (2006.01)
G09G 3/20 (2006.01)
G09G 3/34 (2006.01)

(52) U.S. Cl.
CPC ............ G02B 26/005 (2013.01); G02B 5/201 (2013.01); G09G 3/2003 (2013.01); G09G 3/348 (2013.01); G09G 2300/0452 (2013.01)

(58) Field of Classification Search
CPC ...... G09G 3/28; G02B 26/004; G02B 26/005; G02B 2207/115
See application file for complete search history.

(56) References Cited

U.S. PATENT DOCUMENTS

| 8,723,759 | B2* | 5/2014 | Parry-Jones | G02B 26/005 345/60 |
|---|---|---|---|---|
| 2010/0283803 | A1 | 11/2010 | Chou | |
| 2013/0155480 | A1 | 6/2013 | Lee et al. | |
| 2013/0163068 | A1 | 6/2013 | Matsuoka et al. | |
| 2013/0182309 | A1* | 7/2013 | Kim | G02B 26/005 359/290 |
| 2013/0242367 | A1 | 9/2013 | Cho et al. | |
| 2014/0029080 | A1* | 1/2014 | Hwang | G02B 26/005 359/290 |

OTHER PUBLICATIONS

Nicolas Eugene Bergeron, et al., "Electrowetting Element", U.S. Appl. No. 14/179,032, filed Feb. 2014.

* cited by examiner

*Primary Examiner* — Antonio A Caschera
(74) *Attorney, Agent, or Firm* — EIP US LLP

(57) ABSTRACT

An electrowetting display device comprising: a first fluid adjoining a surface of a support plate; a second fluid; a color filter for outputting light with a predetermined hue; a transmissive region configured to transmit light of at least one wavelength filtered by the color filter; and an electrode for use in applying a voltage to control a configuration of the first and second fluids. In a first configuration the first fluid adjoins a first extent of the surface and overlaps a first extent of the color filter and a first extent of the transmissive region. In a second configuration the first fluid adjoins a second extent of the surface and overlaps a second extent of the color filter and a second extent of the transmissive region.

25 Claims, 7 Drawing Sheets

ELECTROWETTING DISPLAY DEVICE WITH SHAPED COLOUR FILTER

BACKGROUND

In known electrowetting display devices the colour gamut for images displayed by the device may be controlled by designing pixel colour filters with appropriate hue and saturation parameters for example. However, such images can have a lower than desired luminance.

It is desirable to improve luminance of display effects provided by an electrowetting display device.

DETAILED DESCRIPTION

Figure 1:
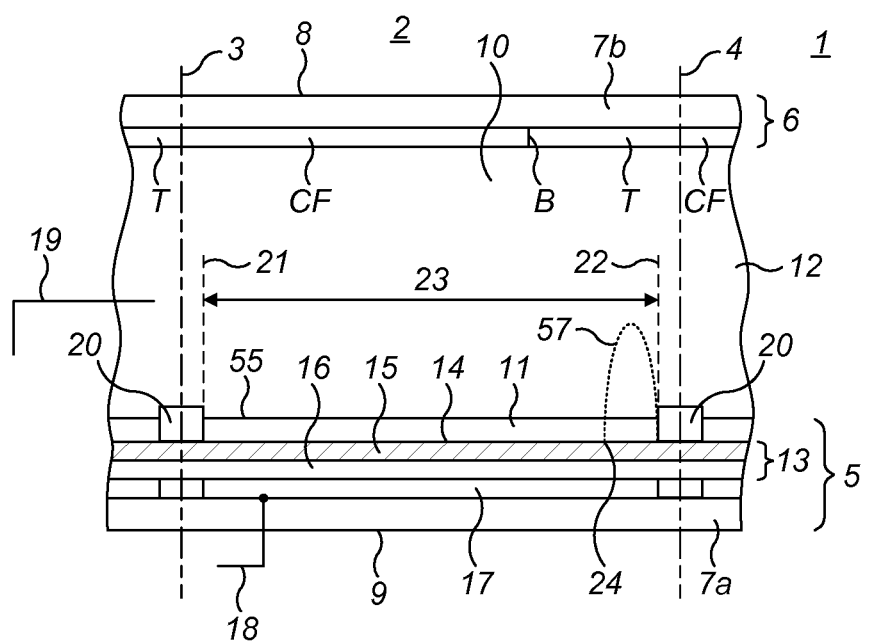
FIG. 1 shows schematically an example electrowetting display element.

FIG. 1 shows a diagrammatic cross-section of part of an example of an electrowetting device. In this example the device is an electrowetting display device 1 including a plurality of electrowetting elements, which are picture elements 2, otherwise referred to as display elements, one of which is shown in the Figure. A plurality of electrowetting elements may define a pixel for providing a display effect, each electrowetting element of the plurality being a sub-pixel for providing a sub-pixel display effect. The lateral dimension of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

In examples to be described, the electrowetting element includes a colour filter CF for filtering at least one wavelength from input light, for example light incident on the colour filter, to output from the colour filter CF light with a predetermined hue. A predetermined hue is for example a particular colour which has been selected for the colour filter to output. In other words light exiting the colour filter has the predetermined hue. The colour filter is, for example, a non-switchable colour filter; in other words, the colour filter has a fixed shape and therefore a spatial configuration of the non-switchable colour filter is not changeable, for example is not switchable. Thus, the non-switchable colour filter may be a non-fluid colour filter. This may be contrasted with for example the first fluid described below, which may include a dye or pigment therefore to act as a colour filter which is switchable between different first fluid configurations. As explained below, the colour filter further contributes to a display effect provided by the electrowetting element, in addition to a configuration of the first and second fluids. In the example of FIG. 1 there is a colour filter layer, in other words a layer including a colour filter, and in this example is lying on a surface of the second support plate 7b, which surface is a surface of the second support plate nearest to the space described below. It is to be appreciated in further examples that the colour filter layer may be located in a different position in the electrowetting element, for example on a surface of the second support plate furthest away from the space or as part of the first support plate, provided the colour filter layer is located such that light passing through the element to provide a display effect passes through the colour filter layer. Alternatively, the colour filter layer may be located in the first support plate; where the display element operates in a reflective manner, the colour filter layer may be located between a reflector (such as a reflective electrode) and the surface adjoined by at least one of the first or second fluids.

The colour filter layer in examples has at least one first region formed of a material functionable as the colour filter and at least one second region non-overlapping with and adjoining the at least one first region, the at least one second region formed of a material functionable as the transmissive region. The first region comprises the colour filter CF. The colour filter absorbs at least one wavelength of light, for example in the visible spectrum, thus filtering the light passing through the colour filter. The colour filter may be formed of a material having a colour filtering property. The second region is a transmissive region T which is for example transmissive, for at least one wavelength of light which is absorbed by the colour filter and for example is transmissive for substantially all light incident on the second region, for example substantially all wavelengths of light in the visible light spectrum. In other words, the transmissive region T is configured to transmit light through the transmissive region without substantially outputting the predetermined hue which is output by the colour filter. The term substantially used here means there is a degree of tolerance in the amount of light transmitted by the second region. The transmissive region may not therefore transmit all light but may transmit enough light such that a performance of the electrowetting element is not impeded. For example, the second region may transmit 90%, 95% or greater of light incident on the second region. The second region may for example transmit three times greater, or more, light than the first region. The second region may for example be formed of a suitable material or may be an opening, in other words an aperture or a hole or a space, in the colour filter layer, through which light may pass. Examples of a material for forming the colour filter include a resist material such as the JSR OPTMER™ CR series. These are pigment dispersed photo-resists. Where the second region is formed of a material, an example material for forming the second region is selected from the JSR OPTMER SS series. These are heat-curable materials which can be used as protective overcoatings for a colour filter region, but which can also be used to form the second region. They are mainly composed of acrylic polymers. The skilled person would readily understand how to form such a colour filter layer with patterned first and second regions.

Further details of the colour filter and the transmissive region will be described later.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two fluids, which in this example are liquids. In the example of FIG. 1, the space 10 is filled with a first fluid 11 and a second fluid 12 which in the absence of an applied voltage each form a layer.

The second fluid is electrically conductive or polar and may be water or a salt solution such as a solution of potassium chloride in water. The second fluid may be transparent, but may instead be coloured, white, absorbing or reflecting. "Electrically conductive" for example means that the second fluid is capable of conducting electricity; for example an electrical current may flow through the second fluid due to the flow of ions through the second fluid. "Polar" in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid is electrically non-conductive and may for instance be an alkane like decane or hexadecane or may be an oil such as silicone oil.

The second fluid is immiscible with the first fluid. Therefore, the first fluid and the second fluid do not substantially mix with each other and in some examples do not mix with each other to any degree. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids at least partially meet, for example contact, each other at an interface labelled 55 in FIG. 1 for when no voltage is applied and labelled 57 for when a voltage is applied, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, for example absorbing for substantially all parts of the optical spectrum, or reflecting. A reflective first fluid may reflect the entire visible spectrum, making the layer appear white, or part of it, making it have a colour. In examples to be described below, the first fluid is black and therefore absorbs substantially all parts of the optical spectrum, for example in the visible light spectrum. The term "substantially absorbs" includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

The support plate 5 includes an insulating layer 13. The insulating layer may be transparent or reflective. The insulating layer 13 may extend between walls of a picture element. To avoid short circuits between the second fluid 12 and electrodes arranged under the insulating layer, layers of the insulating layer may extend uninterrupted over a plurality of picture elements 2, as shown in the Figure. The insulating layer has a surface 14 facing the space 10 of the picture element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon®-AF1600. The barrier layer 16 may have a thickness, taken in a direction perpendicular the plane of the substrate, between 50 manometers and 500 manometers and may be made of an inorganic material like silicon oxide or silicon.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes an electrode 17 as part of the support plate 5. The electrode is associated with, for example overlaps, the surface of the support plate providing the display area. In examples shown there is one such electrode 17 per display element. The electrode 17 is separated from the fluids by the insulating layer 13; electrodes of neighbouring picture elements are separated by a non-conducting layer. For a display element having a reflective operation, rather than transmissive, the electrode in some examples is reflective.

Further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display control apparatus. In a display device having the picture elements arranged in a matrix form, the electrodes can be coupled to a matrix of control lines on the substrate 7.

The first fluid 11 in this example is confined to one picture element by at least one wall, in this example walls 20 that follow the cross-section of the picture element. The cross-section of a picture element may have any shape; when the picture elements are arranged in a matrix form, the cross-section is usually square or rectangular, but in other examples different cross-sectional shapes are envisaged. In such examples it is envisaged that the cross-sectional shape of the picture element, in combination with a chosen shape of a colour filter described below, can be used to control the properties (such as luminance and saturation) of a display effect provided by a picture element.

Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The dimension of the picture element, indicated by the dashed lines 3 and 4, is defined by the centre of the walls 20. The area of the surface 14 between the walls of a picture element, indicated by the dashed lines 21 and 22, is called the display area 23, over which a display effect occurs and which is adjoined by the first fluid. The display effect depends on a size of area that the first and second fluids adjoin the surface defined by the display area, in dependence on the magnitude of the applied voltage V described above. The magnitude of the applied voltage V therefore determines the configuration of the first and second fluids within the electrowetting element and is used to control the fluid configuration. When switching the electrowetting element from one fluid configuration to a different fluid configuration the size of area of second fluid adjoining the display area surface may increase or decrease, with the size of area of first fluid adjoining the display area surface decreasing or increasing, respectively. Thus, for a plurality of fluid configurations, the size of area that the first fluid and the second fluid adjoin the display area surface may be different for different of the plurality of configurations.

FIG. 2 shows a matrix of rectangular picture elements in a plan view of the hydrophobic layer of the first support plate. The dimension of the central picture element in FIG. 2, corresponding to the dashed lines 3 and 4 in FIG. 1, is indicated by the dashed line 25. Line 26 indicates the inner border of a wall; the line is also the edge, for example a perimeter, of the display area 23. It is noted that FIG. 1 is taken as a cross-section along the line A-A of FIG. 2.

In examples described herein, an extent of the colour filter CF in a plane parallel to a plane of the surface, for example the display area, is smaller, for example less, than the display area. The phrase "plane parallel to a plane" used herein includes the possibility that the plane is for example substantially parallel to the plane, to account for example for manufacturing tolerances. The colour filter overlaps, for example lies over or covers, part of the surface of the support plate. The first fluid adjoins the surface, with the size of an extent of the surface adjoined by the first fluid depending on the configuration of the first and second fluids. The surface corresponds with the display area described previously. The extent of the colour filter is the extent, for example an area, of the colour filter which overlaps with, for example lies over, the display area and through which light may pass for providing a display effect. In examples described herein, with the colour filter having a smaller extent than the display area, a proportion of light passing or having passed through the display area may not pass through the colour filter. As will become clearer later, this means that a brighter coloured display effect or a white display effect may be provided, for example.

Similarly, an extent of the transmissive region, taken in the plane parallel to a plane of the display area, is smaller than the display area. The transmissive region overlaps a different part of the surface of the support plate than the part overlapped by the colour filter.

In the absence of an applied voltage, for example when the electrowetting element is in an off state, the first fluid 11 forms a layer between the walls 20, as shown in the FIG. 1. Application of a voltage will retract the first fluid (for example due to repulsion of the first fluid by the surface 14) for example against a wall as shown by the dashed shape 57 in FIG. 1, which illustrates a substantially fully retracted configuration of the first fluid. A substantially fully retracted configuration of the first fluid is for example where an applied voltage is the maximum applied voltage that the control system is configured to output. In other words, the substantially fully retracted configuration is the extreme on state of the display element, for example corresponding to a brightest display effect. The substantially fully retracted state may not be the maximum retracted first fluid configuration; for example, a greater voltage may be applied to retract the first fluid further, but the control system is not configured to provide that applied voltage.

The controllable shape of the first fluid, in dependence on the magnitude of applied voltage, is used to operate the picture element as a light valve, providing a display effect over the display area 23. For example, switching the fluids to increase adjoinment of the second fluid with the display area surface may increase the brightness of the display effect provided by the element.

Specific examples of the colour filter and transmissive region will be described below. In these examples and further envisaged examples, the configuration of the first and second fluids is switchable, in dependence on the magnitude of the applied voltage, between at least a first configuration and a second configuration. In the first configuration the first fluid adjoins a first extent of the surface of the support plate and the first fluid overlaps a first extent of the colour filter and a first extent of the transmissive region. In the second configuration, the first fluid adjoins a second extent of the surface of the support plate and the first fluid overlaps a second extent of the colour filter and a second extent of the transmissive region. The first extents are each different from the second extents. In this way, for a given change in extent of the surface adjoined by the first fluid, the change of extent of the colour filter overlapped by the first fluid may be proportionally less than the change of extent of the transmissive region overlapped by the first fluid. Therefore, in such an example, a change in luminance may be more significant than a change in saturation of a given hue. This will be explained in further detail below, but as will be appreciated, this means that by changing of a configuration of the first and second fluids, a saturation of a given hue and a luminance of a display element may for example be changed simultaneously. The proportion of change of the saturation and of the luminance may be different, the precise change of saturation and luminance depending on the specific construction, including shape and dimensions, of the colour filter and of the transmissive region. The construction of the colour filter and transmissive region in accordance with examples described herein therefore gives more design freedom for controlling colour saturation and luminance within a display element. Consequently, a display effect with a greater luminance may be provided compared with known systems, due to the incorporation of the transmissive region within the display element. Further, the luminance and saturation levels can be different for different fluid configurations, allowing more control over specific display effects that a display element can provide. This gives a designer more design freedom to tune a display element, and indeed a plurality of display elements forming a pixel, to provide a required display effect, so that the display device can display display effects within a desired colour space, for example the sRGB or AdobeRGB colour space which is well known to the person skilled in the art.

Furthermore, such a display element having the colour filter and the transmissive region can reduce cross-talk of coloured light between adjacent display elements. Such cross-talk can occur if light having entered one display element is then reflected at an angle so as to exit the display device via a different display element. In so doing, that light may pass through two different colour filters. With the presence of the transmissive region in at least one display element, light entering or exiting a display element may pass through such a transmissive region, rather than a colour filter, therefore the presence of the transmissive region reduces the chance of light passing through two different colour filters. As a consequence a viewing angle of an image provided by the display device can be increased.

Specific examples of the colour filter and transmissive region will now be described.

It is noted that a configuration of the first and second fluids may not be formed as illustrated in the FIGS. but may in reality have some degree of irregularity, which is not shown. For example, an edge of an interface between the first and second fluids described below and which adjoins the surface of the first support plate may not be straight but may instead be irregular to some extent in form. Further, movement of the first and second fluids during switching of the fluid configuration may be irregular rather than perfectly following an axis of motion. This is for example due to the fluid nature of the first and second fluids as will be appreciated by the skilled person.

In a plane parallel to a plane of the surface of the support plate, a dimension, for example a width, of at least part of the colour filter may decrease in a direction away from an edge side S (see FIG. 2A) of the colour filter. This direction is for example a direction away from the edge side of the colour filter, which edge side the interface (at which the first and second fluids at least partially contact each other) is retractable away from in dependence on the magnitude of the voltage. The direction may be substantially parallel to an axis for motion of the interface over the surface. The interface may for example adjoin the surface as a line along which the first fluid, second fluid and the surface contact each other, which line corresponds with an edge of the interface. The line is for example substantially parallel to the edge side of the colour filter. In some examples the line is substantially perpendicular to the axis for motion, though noting that there may be a degree of irregularity as explained above. The term substantially used here in relation to the direction being substantially parallel to an axis for motion and the line being substantially perpendicular to the axis for motion refers to the fact that the line of the interface and the motion of the interface in dependence on the applied voltage is not perfect. For example the line may not be perfectly straight and its shape and orientation may change to some degree when moving over the surface. Therefore, the line may be taken to be an average, for example a mean, line taken across the edge of the interface. Similarly, the axis for motion may not be perfectly straight at all times when changing the configuration of the fluids. The direction of motion may change to some degree. Therefore, the axis for motion may be taken to be an average, for example a mean, line along which the interface moves when switching the configuration of the fluids.

An example is now explained using FIGS. 2A to 2D. The axis for motion AM of the interface is illustrated which is substantially perpendicular to the line 24. The line may advance in either direction along this axis depending on the change in applied voltage.

Figure 2A:
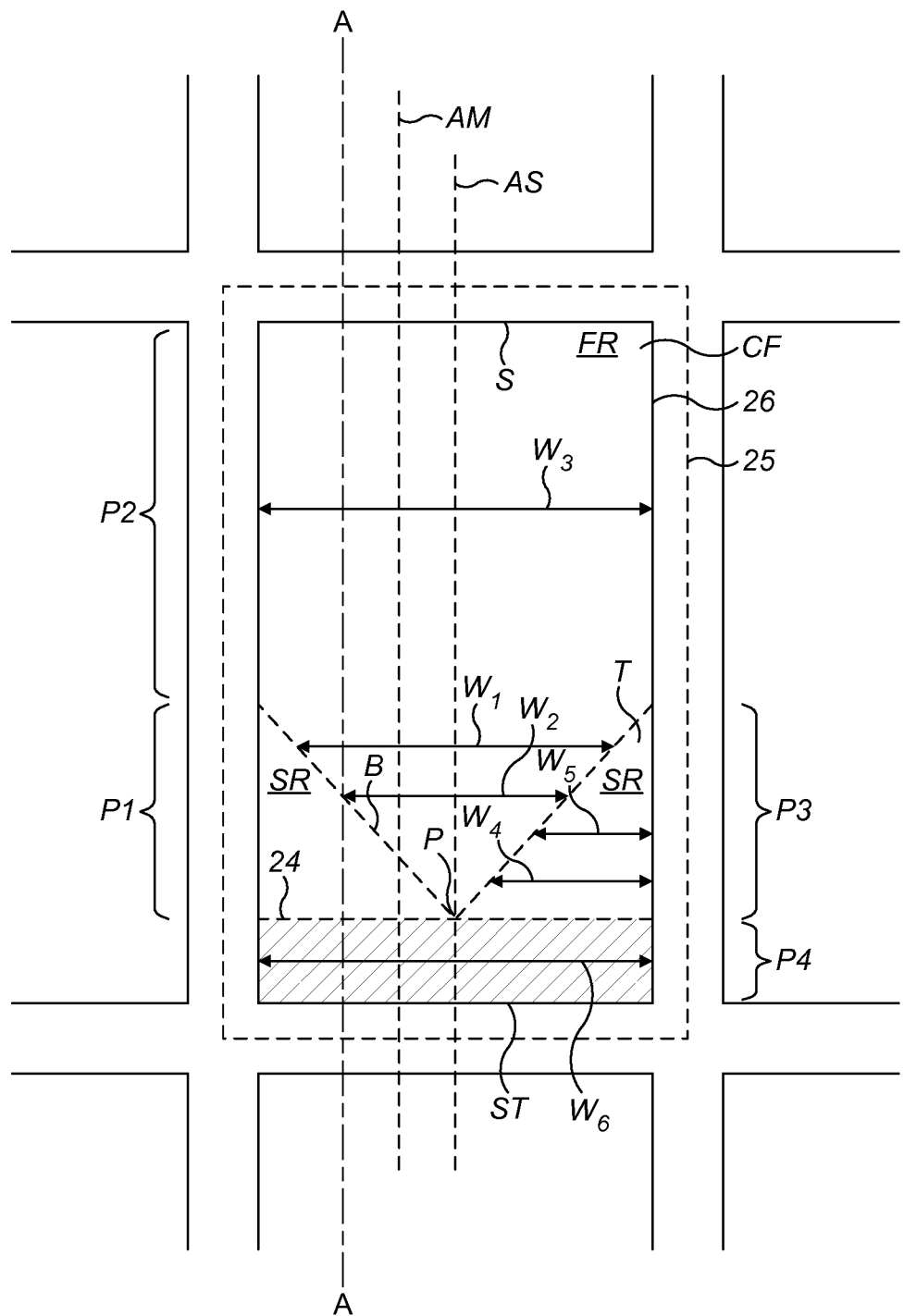
FIGS. 2A to 2D are plan views showing different fluid configurations for the example display element.

As illustrated in FIG. 2A for example, a first width W1 of the colour filter is greater than a second width W2 at a different location along the axis for motion AM which is nearer an edge side S of the colour filter which for example overlaps a side of the display area. Therefore, width decreases in a direction away from the side S of the colour filter.

The at least one first region comprising the colour filter and the at least one second region comprising the transmissive region together have an extent which overlaps the whole of the display area in examples. In such examples the colour filter and the transmissive region may adjoin each other at a boundary. For example, the colour filter and the transmissive region may lie adjacent to each other in a plane parallel to a plane of the surface area.

In the example of FIGS. 1 and 2A to 2D, the boundary is labelled B. In this example, there is one first region FR of the colour filter layer which comprises the colour filter. There is also one second region SR of the colour filter layer which comprises the transmissive region. The first and second regions FR, SR adjoin each other along the boundary B and otherwise have an extent limited by the lateral dimension of the display element 25. The first and second regions are illustrated in this example as areas in FIG. 2A with particular geometric properties, as will be explained in further detail shortly. It is to be appreciated that in different examples a first and second region of the colour filter layer may have different geometric properties, for example in shape and/or dimension, but may still exhibit the characteristics which are now described.

In a plane parallel a plane of the surface adjoined by the first fluid, the colour filter may comprise a first part having a dimension, for example a width, with a magnitude which decreases in a direction away from an edge side of the colour filter. The colour filter may further comprise a second part having a dimension, for example a width, with a magnitude which is substantially uniform in the direction away from the edge side of the colour filter, the widths of the first part and second part being parallel to each other. Referring to the example of FIG. 2A, the first part of the colour filter is indicated as P1 and the second part of the colour filter is indicated as P2. The width of the first part depends on the location along the axis AM but may for example be the second width W2. The width of the second part is indicated as W3 and it is clear that along the axis AM the width of the second part remains substantially uniform, for example substantially constant whilst allowing for any variations within acceptable manufacturing and operational tolerances for the device.

The first part adjoin the second part where the width of the first part is greatest, the width of the second part being substantially equal to the greatest width of the first part. In the example of FIG. 2A, the first and second parts adjoin where the first and second parts meet, as indicated by the brackets labelled P1 and P2. With the width of the second part W3 being substantially equal to the greatest width of the first part, a smooth transition in a decrease in width may be provided from the second part to the first part.

In a plane parallel a plane of the surface of the support plate, a part of the colour filter may have a smallest width of the colour filter. This smallest width substantially overlaps either a side of the surface which adjoins a wall of the support plate, or a line along which the first fluid, the second fluid and the surface contact each other, for example a three phase line, which line corresponds to a configuration of the first and second fluids with the first fluid being substantially fully retracted. In the example of FIG. 2A, the smallest width of the colour filter is indicated as a point P. In this example the point P substantially overlaps the line corresponding to the substantially fully retracted first fluid. This means that the first fluid can retract to a position without substantially overlapping, for example lying over or being covered by, the colour filter, which can increase a luminance of a display effect corresponding to that fluid configuration, due to a greater extent of the transmissive region not being overlapped by the first fluid. Substantially indicates that in examples there is a degree of tolerance within acceptable operational limits.

A dimension, for example a width, of the transmissive region, taken in a plane parallel to the plane of the surface of the support plate, may have a magnitude which decreases in a direction away from an edge side ST of the transmissive region, which edge side ST for example overlaps a side of the display area. The edge side ST may for example be on an opposite side of the colour filter layer of the display element than the edge side S of the colour filter. Therefore, a magnitude of a width of the transmissive region may decrease in a direction substantially parallel to an axis for motion of the interface over the surface adjoined by the first fluid. For example, the width of the transmissive region decreases in a direction away from an edge side of the transmissive region from which edge side the interface is retractable towards in dependence on the magnitude of the voltage.

In some examples the transmissive region comprises at least one first part having a width with a magnitude which decreases in a direction away from the edge side of the transmissive region (as illustrated by labels W4, W5) and a second part having a width W6 which is substantially uniform in the direction away from the edge side of the transmissive region. In such examples, the widths of the first and second parts of the transmissive region are parallel to each other. The at least one first part and the second part adjoin each other for example where the width of the first part is greatest. In the example of FIG. 2A, the transmissive region comprises two first parts (indicated with P3) and a second part P4. Within each of the first parts P3 (and indicated for one of the first parts P3) a fourth width W4 of the transmissive region is greater than a fifth width W5 at a different location along the axis for motion AM, which fourth width W4 is nearer the edge side of the transmissive region than the fifth width W5. Therefore, a magnitude of a width of the transmissive region decreases away from the edge side ST of the transmissive region within a first part P3. A width of the second part P4 is indicated as W6 and it is clear that along the axis AM the width of the second part P4 of the transmissive region remains substantially uniform. Substantially uniform has a similar meaning as described previously for the colour filter.

Figure 5:
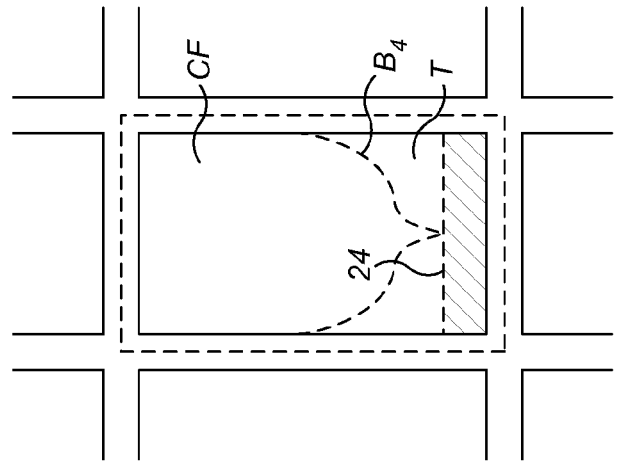
FIGS. 3, 4 and 5 are plan views showing different examples of a colour filter of an electrowetting display element.
Figure 4:
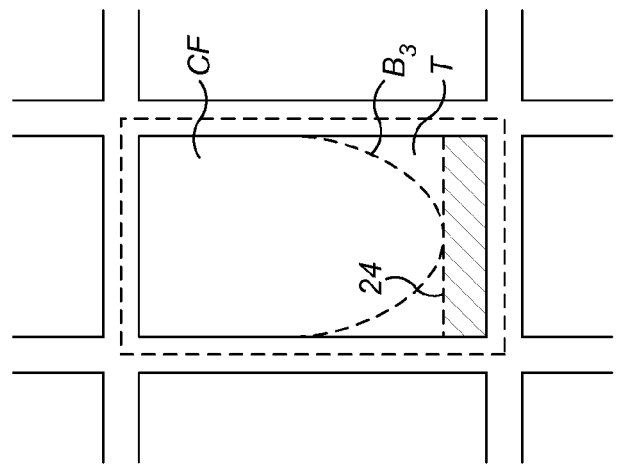

In a plane parallel to a plane of the surface adjoined, within acceptable manufacturing tolerances for example, by the first fluid, the colour filter may have a shape which is substantially symmetrical along an axis of symmetry substantially perpendicular to an edge side of the colour filter, from which edge side the interface is retractable away from in dependence on the magnitude of the applied voltage. The axis of symmetry is in some examples parallel to an axis for motion of the interface over the surface. In the example of FIG. 2A the axis of symmetry is illustrated by dashed line AS. With the colour filter having a symmetrical shape, and in further examples the transmissive region also being symmetrical along the axis of symmetry, a change of configuration of the fluids may be such that the interface moves in a direction along the axis for motion; this gives a balanced, for example even, change in saturation and/or luminance of the display effect of the display element. It is appreciated that in other examples, where a different change in display effect is required, an asymmetric shape of the colour filter may be used. In a plane parallel a plane of the surface adjoined by the first fluid, at least part of the colour filter has, examples, one of: a V-shaped outline, a U-shape outline or a bell shape outline. Thus, in each of these examples, a width of the colour filter narrows, for example tapers, for example along an axis for motion for the interface. The example of FIGS. 2A to 2D illustrate a V-shape outline shaped colour filter. FIG. 4 illustrates an alternative example with a U-shape outline with boundary B3 between the colour filter CF and the transmissive region T. FIG. 5 illustrates an alternative example with a bell shape outline with boundary B4 between the colour filter CF and the transmissive region T. Each of these shapes as illustrated demonstrate the symmetry along the axis of symmetry AS. Having a smooth and gradual change in the width of part of the colour filter helps to reduce visible artefacts when changing the fluid configuration.

A U-shape has, for example, an outline with two parallel lines spaced from each other which meet along a curved line joining the two parallel lines, an example of which is shown in FIG. 4. A V-shape has for example an outline with two straight lines which are not parallel with each other and which converge to meet at an apex; in other words, for example, two straight lines are angularly displaced relative to each other by an angle forming an apex, which angle is for example less than 180 degrees and for example less than or equal to 90 degrees. A bell shape outline has a form corresponding to the outline of a cross section of a bell; for example a bell shape outline may be considered to have a shape corresponding to two curved lines diverging from each other from a point with a relatively shallow rate of divergence, followed by a relatively steep rate of divergence, followed again by a relatively shallow rate of divergence.

In a plane substantially parallel to, for example parallel to, the plane of the surface adjoined by the first fluid, at least part of the colour filter may be located between a first part of the transmissive region and a different first part of the transmissive region. This can be seen for example in FIG. 2A which shows the first part P1 of the colour filter being located between the two first parts P3 of the transmissive region T. A similar layout of a part of the colour filter between parts of the transmissive region applies for the examples of FIGS. 4 and 5. Again, similar to the symmetrical shape of the colour filter, this location of the part of the colour filter between parts of the transmissive region can help give a balanced and even change in saturation and/or luminance of the display effect provided by the display element. It is envisaged in alternative examples that a transmissive region may be located between different parts of the colour filter.

The change of a display effect provided by the display element of FIG. 1 will now be explained with reference to FIGS. 2A to 2D.

In each of FIGS. 2A to 2D the location of the first fluid and therefore the extent of the surface, for example the display area, of the support plate adjoined by the first fluid is illustrated with diagonal hatching.

In FIG. 2A the magnitude of the applied voltage is such that the first fluid adjoins part of the surface of the support plate so as to overlap with the second part P4 of the transmissive region, as illustrated by the line 24. Therefore, in this fluid configuration, the first fluid does not overlap any of the colour filter. The first fluid is therefore in this example in its substantially fully retracted configuration as described earlier. The display effect of the display element therefore has the highest luminance that is available using the display element as the maximum area of the transmissive region is not overlapped by the first fluid, meaning more light may pass through the colour filter layer to the viewing side. With this extra luminance, the saturation of the hue of the display effect outputted by the colour filter may be perceived as weaker.

Figure 2D:
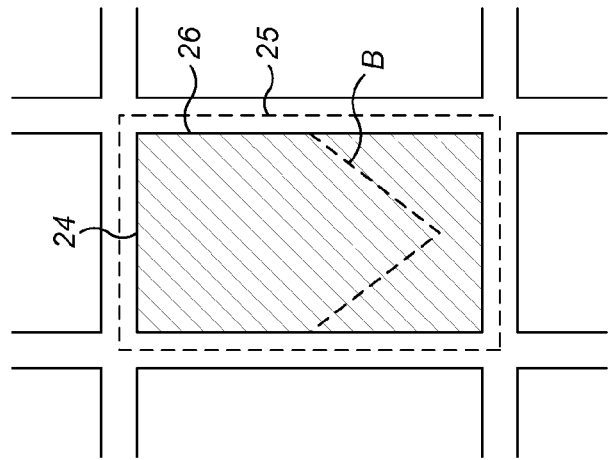
Figure 2C:
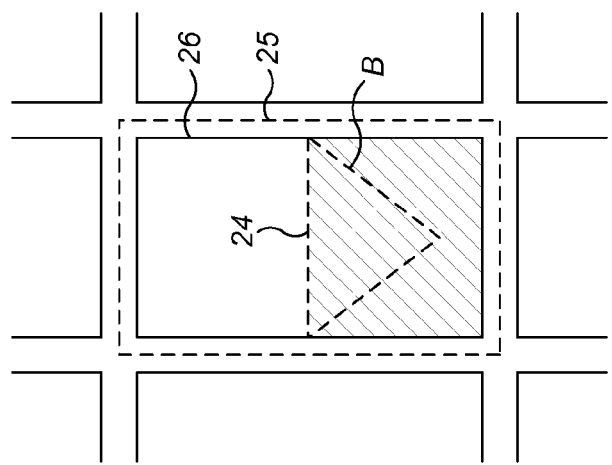
Figure 2B:
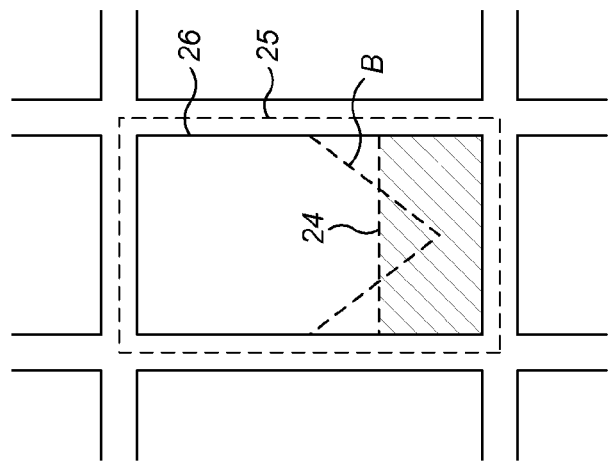

FIG. 2B shows a different configuration of the first and second fluids, with the line 24 of adjoinment of the interface with the surface in a different position, further along the axis for motion AM. In this configuration the first fluid adjoins a different extent of the surface of the support plate than in the configuration of FIG. 2A. Plus, the first fluid overlaps a different extent of the colour filter and of the transmissive region than the fluid configuration of FIG. 2A. Specifically, the first fluid now overlaps with part of the first part P1 of the colour filter in addition to overlapping the second part P4 of the transmissive region. Consequently, the display effect of the display element as configured in FIG. 2B is less luminant, for example bright, than for FIG. 2A and may also have a greater saturation of hue given the reduced luminance.

FIG. 2C shows a further fluid configuration with the first fluid overlapping all of the transmissive region and all of the first part of the colour filter. As a result, the display effect is darker, for example less luminant than the display effect of FIGS. 2A and 2B. The saturation of the display effect is however greater for FIG. 2C than for FIG. 2A or FIG. 2B due to the reduced luminance. The configuration of FIG. 2C may be considered to be the most luminant full saturation display effect.

FIG. 2D shows a further fluid configuration with the first fluid overlapping all of the transmissive region and all of the colour filter. This may be considered an off state as, with the first fluid being a black fluid for example, for substantially absorbing a majority of visible light, a dark, for example black display effect will be provided.

It will be appreciated that, as in examples such as those shown with FIGS. 2A to 2D, with a magnitude of a dimension, for example a width, of at least part of the colour filter decreasing in a direction away from the edge side S of the colour filter and with a magnitude of a dimension, for example a width, of at least part of the transmissive region increasing in the direction, a change of fluid configuration can change both the luminance and saturation properties of a display effect. For example, depending on the direction of motion of the line of adjoinment 24, the luminance may increase as the saturation decreases or vice versa. The direction may be substantially parallel to the axis for motion of the interface over the surface as described previously. This simultaneous changing of the luminance and saturation is useful as it gives more design freedom for designing a sub-pixel for an electrowetting display device. By selecting the total area of the colour filter and the transmissive region, and the shape of each of the colour filter and the transmissive region, each sub-pixel for outputting light with a different hue can be designed specifically to the colour gamut required of the electrowetting display device. Further examples of this will become apparent later.

Figure 3:
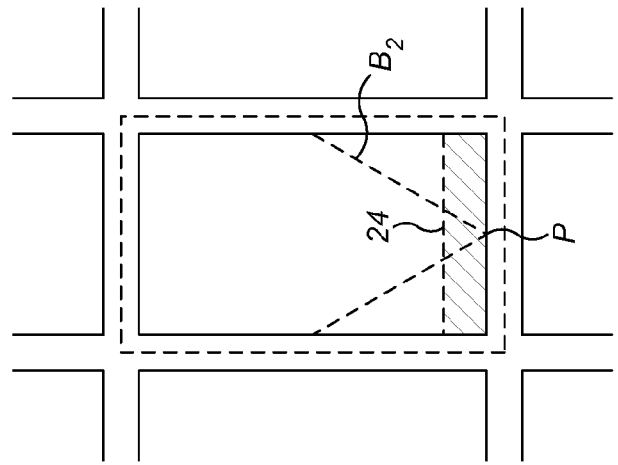

FIG. 3 illustrates an alternative example where the smallest width of the colour filter labelled P is located so as to overlap the edge of the surface, for example of the display area, rather than the line 24 of adjoinment with the first fluid being substantially fully retracted. In such an example the display effect may have a greater saturation and reduced luminance compared with the example illustrated with FIG. 2A. However, such design of the colour filter layer may be appropriate in some examples of an electrowetting display device, depending on the requirements of the colour filter layers for the required colour gamut.

Figure 6:
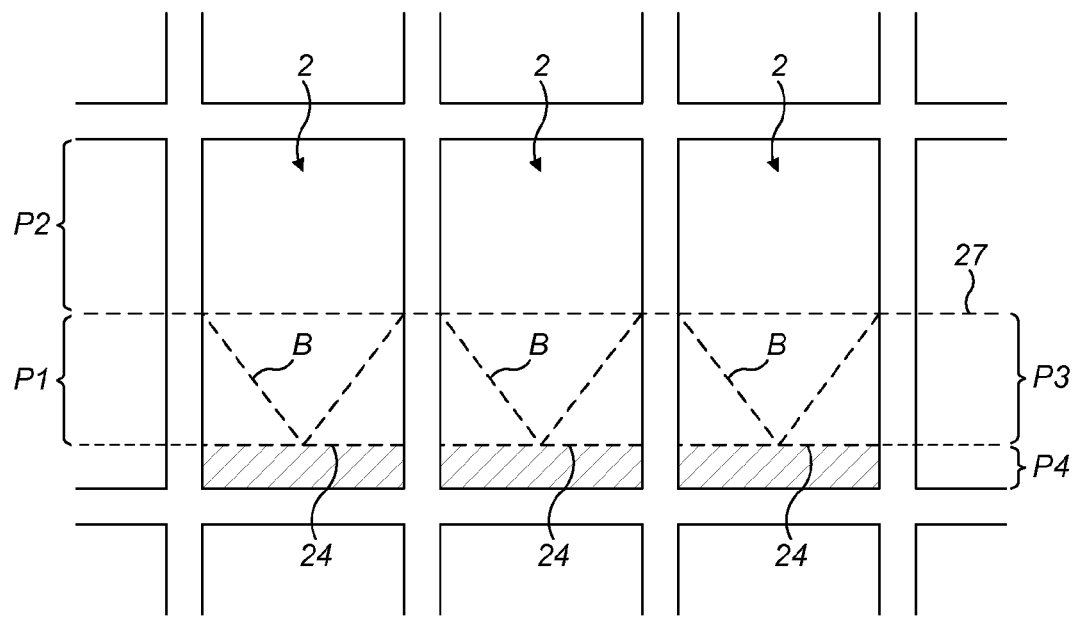
FIGS. 6, 7, 8 and 9 are plan views of different examples of a plurality of electrowetting display elements.

Examples will now be described relating to a plurality of display elements 2 which are each a sub-pixel and which are similar to those described above using FIGS. 1 and 2A to 2D. One example is shown in FIG. 6 which illustrates three display elements 2 each with a different predetermined hue of the colour filter.

These three sub-pixels are shown adjacent to each other in a row, to form a pixel of the display device. For example, one display element may have a colour filter for outputting light with a red (R) hue, one display element may have a colour filter for outputting light with a green (G) hue and the other display element may have a colour filter for outputting light with a blue (B) hue. Thus, the pixel in this example is an RGB pixel though other examples are envisaged.

In this example the size of the display area of each sub-pixel is the same and the design (including size and shape) of the colour filter and the transmissive region is the same for each sub-pixel. Therefore, the size of the first part P1 of the colour filter and the size of the second part P2 of the colour filter is the same for each sub-pixel and is therefore aligned with each other. This is shown by the dashed line 27. In such an example, a fully saturated colour display effect, without any luminance contribution from light passing through the transmissive region, is obtained with the same extent of first fluid adjoinment of the surface for each of the sub-pixels.

Figure 7:
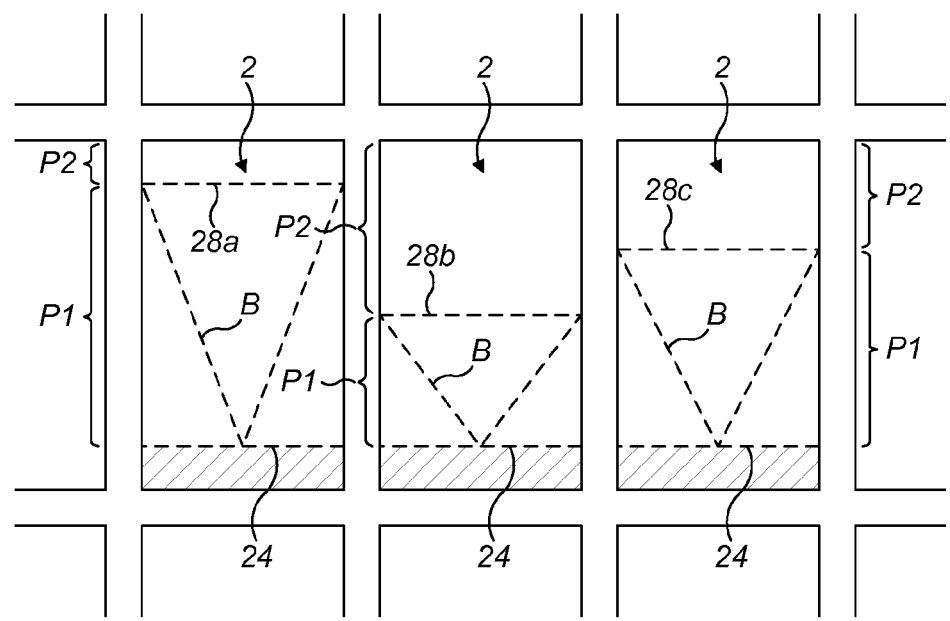

In other examples, the size of the first and second parts P1, P2 of the colour filter and therefore also of the first and second parts of the transmissive region are different for different of the sub-pixels. FIG. 7 illustrates this. In FIG. 7 three sub-pixels are shown as in FIG. 6 except that the size of the first and second parts P1, P2 of the colour filters are different for each sub-pixel. The lines 28a, 28b, 28c illustrate the join between the first and second parts of the colour filter for each of the sub-pixels, respectively. With a different size of the first and second parts of the colour filter (and therefore also of the first and second parts of the transmissive region), each sub-pixel contributes different luminance and saturation characteristics for a display effect of the display element for a given extent of the surface, for example display area, which is adjoined by the first fluid.

Thus, each sub-pixel can be designed specifically for the appropriate hue (e.g. R, G or B) to provide the required range of display effects to contribute to the desired colour gamut for display effects that the pixel can provide. This gives the designer more design freedom to obtain the required colour gamut and change of display effect with changing the position of the line 24 of adjoinment when changing the configuration of the fluids.

Thus, in examples such as those of FIGS. 6 and 7, it is clear that a total area of the colour filter of one of the display elements may be greater than a total area of the colour filter of an other one of the display elements. Therefore, a total area of the transmissive region of one of the display elements may also therefore be less than a total area of the transmissive region of the other one of the display elements.

For tuning the sub-pixel construction to provide a desired range of display effects for a given hue, the designer can control one or any of the following design parameters: a shape of the colour filter, a concentration of a colour filtering material of the colour filter, a thickness of the colour filter or an area of the colour filter. The specific choice of each of these parameters may be different and independently selected for each display element, in order to obtain a pre-determined and desired colour gamut of the pixel and therefore of the electrowetting display device if each pixel is configured the same. As a further example of a design parameter for controlling the colour gamut, a width, in a plane parallel a surface adjoined by the first fluid, of at least part of the colour filter of one of the display elements may decrease in a direction away from an edge side of the colour filter at a greater rate of decrease than a decrease of width of at least part of the colour filter of a different one of the display elements. This can be seen in FIG. 7 for example with a different angled edge of the colour filter between the first part of the colour filter and the first parts of the transmissive region.

Figure 8:
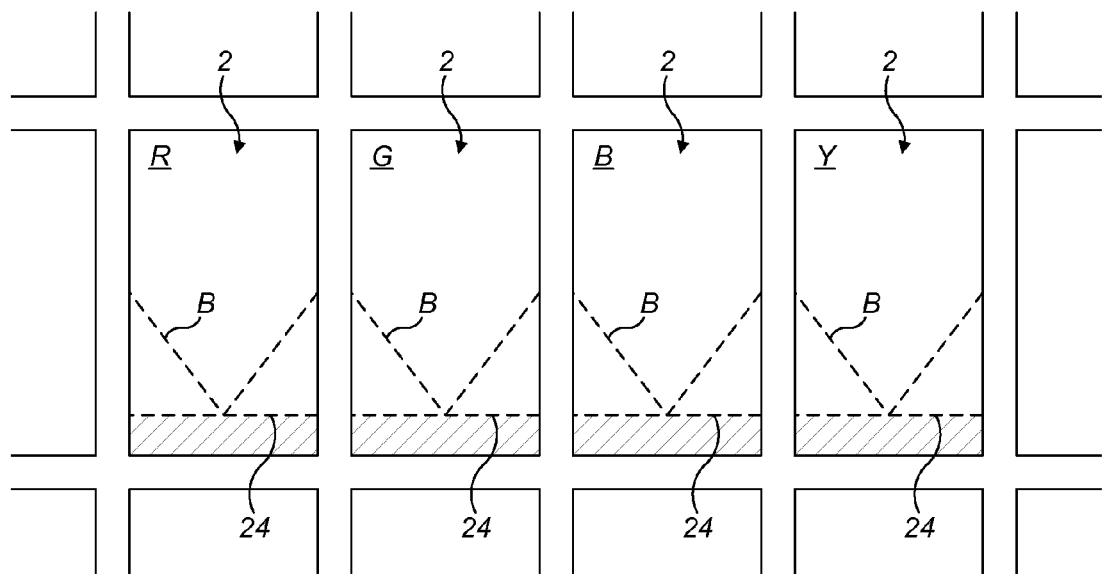

FIG. 8 shows an example of a pixel, in this example with four display elements 2. Each such display element may be similar for example to that described with FIG. 1 but other display element constructions are envisaged for further examples. For example, a first display element has a first fluid adjoining a first surface (corresponding to the display area) of the support plate, a first colour filter for outputting light with a pre-determined hue, the first colour filter overlapping part of the first surface of the support plate, and an electrode (similar to electrode 17 of FIG. 1) for use in applying a voltage to control a size of an area of the first surface adjoined by the first fluid, for controlling a quantity of light passing through the first colour filter. The first colour filter is for example for outputting light with a red hue. In addition to such a first display element, there may also be a second display element, a third display element and a fourth display element with a similar structure as the first display element but with respectively a second, third and fourth colour filter. The labels "first", "second", "third", "fourth" used herein refer to features of the respective first, second, third and fourth display elements. The first, second, third and fourth colour filters are for example for outputting light with a red, green, blue and yellow hue, respectively. At least one of the first, second, third or fourth display elements, for example any of such elements, for example each of the first, second, third, fourth display elements, comprises respectively a first, second, third or fourth transmissive region overlapping a different part of the respective first, second, third or fourth surface of the support plate and configured to transmit light through the respective transmissive region without substantially outputting the respective hue. One display element may therefore have the transmissive region, with the other display elements having a colour filter covering the whole, for example substantially all (within acceptable manufacturing and/or operational tolerances), of the surface adjoined by the first fluid. Or, in other examples, more than one display element, for example all display elements of a pixel as shown in FIG. 8, comprise a transmissive region.

In this example of FIG. 8, the first, second, third and fourth colour filters are configured to output light with respectively a red (R), green (G), blue (B) and yellow (Y) hue. In FIG. 8 the size and shape of the first and second parts of the colour filters are shown as the same for each sub-pixel, though it is envisaged in further examples that they may be different for tuning the colour gamut contribution of each sub-pixel.

It has been found in pixels with three sub-pixels of R, G and B hues that a luminance of display effects can be low. It is known to add a sub-pixel which is transmissive to visible light for contributing light without having been colour filtered to enhance the luminance, for example brightness, of the display effect. This configuration is known in the art as an RGBW pixel with W meaning white due to the W sub-pixel contribution to the display effect. Adding a separate W sub-pixel, although enhancing luminance for some display effects (including a white display effect of the pixel), can however negatively affect certain display effects. For example, a full saturation of a yellow display effect can suffer, by becoming darker. It is therefore possible instead to use a pixel having five sub-pixels of R, G, B, B and Y. The Y sub-pixel is a further display element with a colour filter for outputting light with a yellow hue (Y), for enhancing yellow brightness. Two blue (B) sub-pixels are used. Given the addition of a yellow sub-pixel the white-point of a known pixel with one blue sub-pixel and driven at maximum brightness will change towards yellow. With the addition of a second blue sub-pixel the white-point of a pixel driven at maximum brightness will remain unchanged, as yellow and blue light combine to give white. The two blue sub-pixels may be combined into one sub-pixel area, having twice the luminance of a blue sub-pixel. Such a pixel may be referred to as an RG2BY pixel (the 2 indicating double brightness for the blue sub-pixel). Further, if a device receives image data representing for example an image with the sRGB colour gamut, processing the input RGB data is required to generate signal data for rendering the image according to the RG2BY pixel architecture.

It has been realised that there is an alternative. It is possible to provide a pixel with RGBWY functionality within a four sub-pixel architecture. This can be achieved using for example the pixel architecture illustrated in FIG. 8. The transmissive regions contribute a white, for example W part of the pixel and therefore a separate W sub-pixel or a separate blue B sub-pixel (as is the case for an RG2BY pixel) is not required. Therefore, an RGBWY functionality can be provided in a four sub-pixel architecture. In other words, a W sub-pixel is incorporated within the RGBY sub-pixel architecture. Indeed, the ability to increase/decrease the saturation and/or luminance in dependence on the position of the line of adjoinment 24 gives considerable control and design flexibility over the display effects that can be provided which have both a W and Y contribution to the colour gamut. Plus, images of a higher resolution may be displayed and less processing is required to convert sRGB image data input for example to the required signals for controlling the sub-pixels of FIG. 8.

It has been found that such a RGBY architecture gives suitable results and that the colour filter and transmissive region parameters can be tuned appropriately such that images can be displayed which meet the sRGB colour gamut requirements.

In RGBY examples such as that of FIG. 8, the addition of a yellow sub-pixel can require appropriate tuning of the parameters of the other colour filters and transmissive regions. For example, addition of a yellow colour filter can require an increased brightness for the blue sub-pixel (for example by adjusting an extent, for example area, or the concentration of colour absorbing material in the colour filter, of the blue colour filters, or increasing an area of the transmissive region so as to add white light). This is because yellow light and blue light together form white light, so adding a yellow hue colour filter can change the white-point for maximum luminance (for example brightness) contributions to display effects with all sub-pixels being driven to a maximum brightness display effect unless the brightness of the blue hue contribution is enhanced. In some examples, the colour filter layer of the blue sub-pixel is configured to provide a maximum brightness display effect which has approximately twice (for example within acceptable manufacturing and/or operational tolerances) the brightness of the yellow sub-pixel when driven to provide the maximum brightness display effect. For example, a size of the area of the transmissive region for the blue sub-pixel may be approximately twice (for example within acceptable manufacturing and/or operational tolerances) a size of the area of the transmissive region for the yellow sub-pixel; such examples can therefore be considered to provide an RG2BWY sub-pixel functionality in an RGBY pixel architecture.

Figure 9:
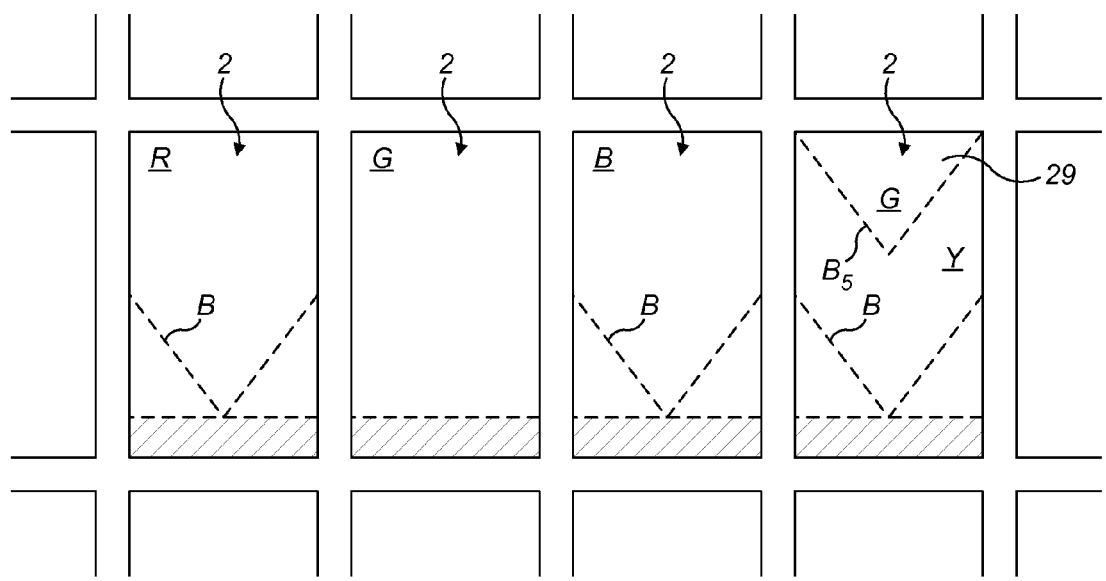

It is observed that light with a saturated green hue requires a greater brightness than other hues to have a given luminance, due to its larger contribution (for example 70%) to the brightness of white. Given this, the display element with the colour filter for outputting the green hue may not have a transmissive region and therefore the colour filter layer may comprise solely a colour filter for outputting light with a green hue. In other words the second colour filter, in this case the G colour filter, overlaps substantially all of the second surface. To further increase the brightness of saturated green hue, part of the Y sub-pixel 29 can for example be provided with a green colour filter. This enables a better overall match when tuning the colour-space of the display with the sRGB colour-space. This is illustrated in FIG. 9 which shows four display elements 2 and further details are given below.

If it is desired to further increase a saturation of a particular colour, it is envisaged to add a further colour filter to a display element, for example in the colour filter layer. The further colour filter is configured for outputting light with a different predetermined hue than the colour filter of the display element. An example is now described with reference to the right most display element illustrated in FIG. 9. In that example, the colour filter is for outputting light with a yellow hue and the further colour filter is for outputting light with a green hue. This example is therefore useful for further increasing the brightness of the green hue in the pixel, to counter the luminance of the pixel. The further colour filter is labelled 29 in FIG. 9 and has, in a plane parallel the plane of the surface, a width which decreases in the same direction as width of the yellow colour filter. Therefore, in the direction where the width of the further colour filter decreases, the width of the other colour filter decreases. Therefore with the colour filter adjoining the further colour filter, the width of at least part of the further colour filter decreases in a direction away from an edge side of the colour filter. In this example therefore, for display effects where a yellow hue contribution to the display effect is less required, the first fluid adjoins more of the surface of the yellow display element, therefore overlapping with more of the yellow colour filter but leaving more of the green further colour filter not overlapped, for example covered, by the first fluid. With the first fluid for the green display element also being substantially fully retracted, for example, a greater brightness of saturation green hue may be provided for a display effect.

It is envisaged that the transmissive region may be is configured to transmit light through the transmissive region without substantially absorbing light in the visible spectrum. Without substantially absorbing for example means that 90% or more of incident light is transmitted by the transmissive region. Therefore, with a backlight outputting white light, the white light passes through the transmissive region and contributes to a more luminant display effect.

It is envisaged in some examples that the transmissive region is configured for outputting light with a different predetermined hue than the colour filter. Therefore, in such examples the transmissive region may act as a colour filter for outputting light with a particular hue. In those examples however the transmissive region would make less of a contribution to luminance of the display effect than if the transmissive region transmitted light without substantially absorbing light in the visible spectrum.

The above examples are to be understood as illustrative examples. Further examples are envisaged.

Figure 10:
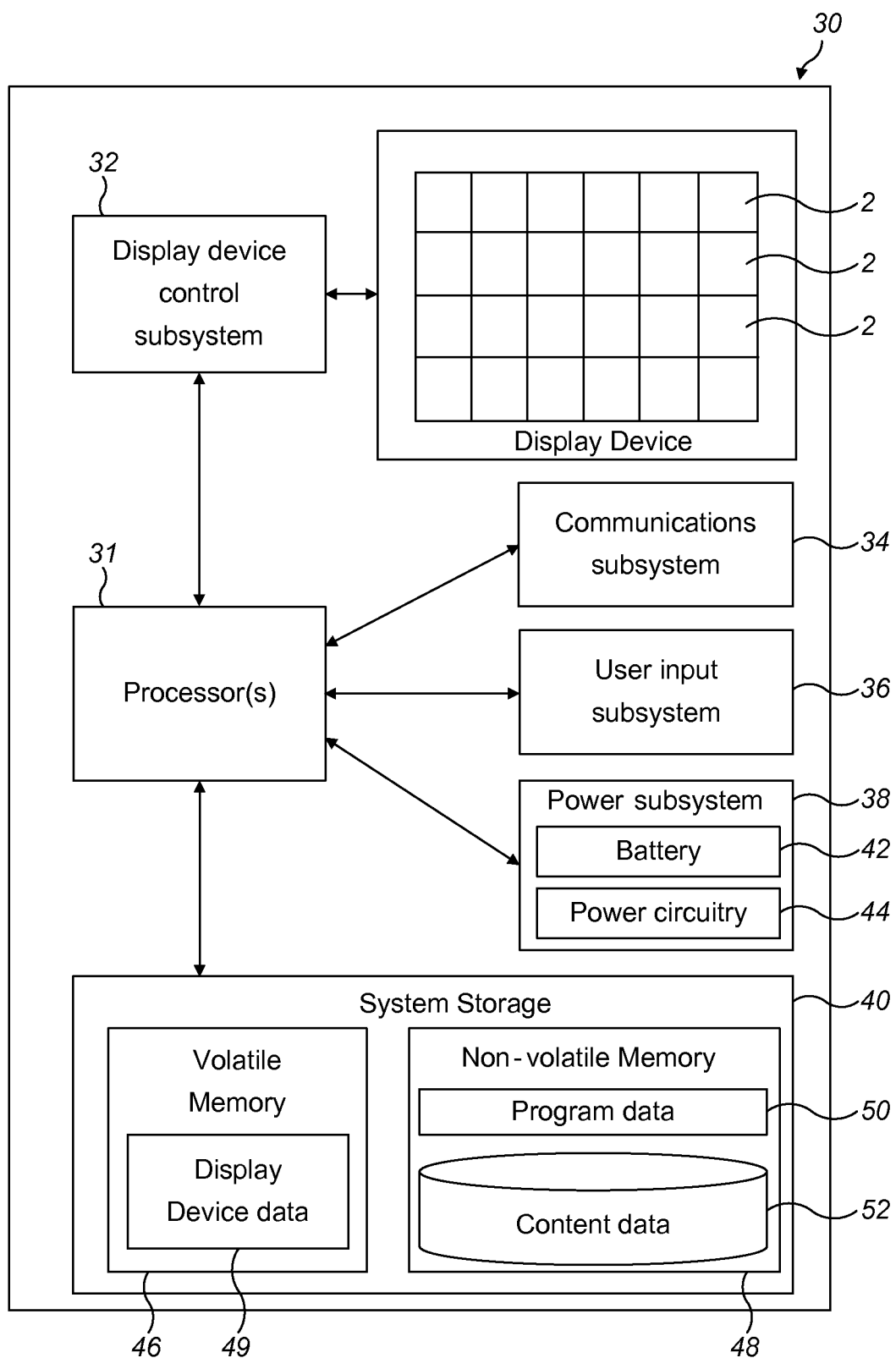
FIG. 10 shows a schematic system diagram of an example apparatus including an electrowetting display device.

FIG. 10 shows schematically a system diagram of an example system, for example apparatus 30, comprising an electrowetting display device such as any of the examples described above, for example the electrowetting display device 1 described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 30. The apparatus includes at least one processor 31 connected to and therefore in data communication with for example: a display device control subsystem 32, a communications subsystem 34, a user input subsystem 36, a power subsystem 38 and system storage 40. The display device control subsystem is connected to and is therefore in data communication with the display device 1. The at least one processor 31 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 40. The at least one processor may additionally, or in the alternative, contain memory, such as processor registers.

The display device control subsystem 32 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 34 for example is configured for the apparatus to communicate with for example a computing device via a data network, for example a computer network such as the Internet, a local area network, a wide area network, a telecommunications network, a wired network, a wireless network, or some other type of network. The communications subsystem 34 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 36 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 38 for example includes power circuitry 44 for use in transferring and controlling power consumed by the apparatus. The power may be provided by a mains electricity supply or from a battery 42, via the power circuitry. The power circuitry may further be used for charging the battery from a mains electricity supply.

The system storage 40 includes at least one memory, for example at least one of volatile memory 46 and non-volatile memory 48 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 10, the volatile memory 46 stores for example display device data 49 which is indicative of display effects to be provided by the display device 1. The processor 31 may transmit data, based on the display device data, to the display device control subsystem 32 which in turn outputs signals to the display device for applying voltages to the display elements, for providing display effects from the display device. The non-volatile memory 48 stores for example program data 50 and/or content data 52. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

In examples, image data which is indicative of an image to be displayed by the display device is receivable via the communications subsystem for example, and/or from the system storage such as the content data. As the skilled person will appreciate, such image data may be in the RGB format. Therefore, where the display device comprises pixels according to the RGBY architecture described above using for example FIG. 8 or 9, it is necessary for the RGB image data to be converted to the appropriate signals for controlling each of R, G, B and Y display elements of a pixel. Algorithms for an RGB to RGBY data conversion are known in the art. Such algorithms may be stored in for example the program data 50. Examples of such an algorithm are now given. In such examples, the at least one memory and the computer program instructions are configured to, with the at least one processor: receive input data indicative of a display effect for the pixel to display. The input data includes: red channel data indicative of a luminance of a red hue component of the display effect; green channel data indicative of a luminance of a green hue component of the display effect; and blue channel data indicative of a luminance of a blue hue component of the display effect. It is then calculated, from the luminance of the red hue component, the luminance of the green hue component and the luminance of the blue hue component, a yellow hue component of the display effect. In turn output data is generated which output data is indicative of the display effect for the pixel to display. The output data includes: output red channel data indicative of a configuration of the first and second fluids of the first display element for displaying a red hue component of the display effect; output green channel data indicative of a configuration of the first and second fluids of the second display element for displaying a green hue component of the display effect; output blue channel data indicative of a configuration of the first and second fluids of the third display element for displaying a blue hue component of the display effect; and output yellow channel data indicative of a configuration of the first and second fluids of the fourth display element for displaying a yellow hue component of the display effect.

In an example, from input data having red channel, green channel and blue channel data (for example RGB image data), an example algorithm (set out in full further below) calculates output yellow channel data indicative of a yellow hue component (Y') for the display effect, for example based on the minimum of a luminance value of the red hue component (R) and a luminance value of the green hue component (G) from the RGB image data (as denoted below by Y'=min(R,G)). The yellow hue component, for example the luminance value, is then subtracted from each of the luminance values of the red and green hue components to generate output red channel data indicative of a luminance of a red hue component (R') and output green channel data indicative of a luminance of a green hue component (G') for the display effect, as denoted below by R'=R-Y' and G'=G-Y' below. In this example the luminance of the blue hue component (B) of the blue channel data of the input data is unchanged for the output blue channel data indicative of the luminance of the blue hue component (B'), though in other examples processing may be involved to modify the luminance of the blue hue component. The example algorithm is now set out:

$Y'=\min(R,G)$ $R'=R-Y'$ $G'=G-Y'$ $B'=B.$

In a second example, a luminance resolution of the display device can be further exploited, by distributing colours which cannot be represented by the yellow colour, using the following algorithm which will be readily understood by the skilled person:

$R_n' = R_n + 0.5*(R_{n+1} - Y'_{n+1})$ $G_n' = G_n + 0.5*(G_{n+1} - Y'_{n+1})$ $B_n' = B_n + 0.5*B_{n+1}$ $Y'_{n+1} = \min(R_{n+1}, G_{n+1})$ $R'_{n+2} = R_{n+2} + 0.5*(R_{n+1} - Y'_{n+1})$ $G'_{n+2} = G_{n+2} + 0.5*(G_{n+1} - Y'_{n+1})$ $B'_{n+2} = B_{n+1} + 0.5*B_{n+1}$ Once such an algorithm has been run, output data indicative of the display effect to be displayed is now in an appropriate RGBY format. This data can be used, in conjunction with the display device control subsystem, to apply appropriate signals to the display elements of the display element, so as to provide the required display effects.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising:
a support plate having a surface;
a first fluid in contact with the surface;
a second fluid immiscible with the first fluid;
a colour filter configured to filter at least one wavelength from input light to output, from the colour filter, light with a predetermined hue, the colour filter overlapping a first part of the surface;
a transmissive region of the electrowetting display device overlapping a second part of the surface, the transmissive region transmissive for light of the at least one wavelength; and
an electrode associated with the support plate for use in application of a voltage to control a configuration of the first fluid and the second fluid,
the configuration of the first fluid and the second fluid being switchable, depending on a magnitude of the voltage, between:
a first configuration with:
the first fluid in contact with a first surface extent of the surface, and
the first fluid overlapping a first colour filter extent of the colour filter and a first transmissive region extent of the transmissive region; and
a second configuration with:
the first fluid in contact with a second surface extent of the surface, and
the first fluid overlapping a second colour filter extent of the colour filter and a second transmissive region extent of the transmissive region.

2. The electrowetting display device according to claim 1, comprising a layer having:
a first region comprising a material functionable as the colour filter; and
a second region non-overlapping with and adjoining the first region, the second region comprising a material functionable as the transmissive region.

3. The electrowetting display device according to claim 1, wherein, in a plane substantially parallel to a plane of the surface, a magnitude of a dimension of at least part of the colour filter decreases in a direction away from an edge side of the colour filter.

4. The electrowetting display device according to claim 1, the first fluid at least partially in contact with the second fluid at an interface, wherein, in a plane substantially parallel to a plane of the surface, a magnitude of a dimension of at least part of the colour filter decreases in a direction away from an edge side of the colour filter, the interface being retractable away from the edge side in dependence on the magnitude of the voltage.

5. The electrowetting display device according to claim 4, wherein the first fluid, the second fluid and the surface contact each other along a line along the surface, wherein the edge side is substantially parallel to the line.

6. The electrowetting display device according to claim 1, the first fluid at least partially in contact with the second fluid at an interface, wherein, in a plane substantially parallel to a plane of the surface, the colour filter has a shape which is substantially symmetrical along an axis of symmetry substantially perpendicular to an edge side of the colour filter, the interface being retractable away from the edge side in dependence on the magnitude of the voltage.

7. The electrowetting display device according to claim 1, wherein, in a plane substantially parallel to a plane of the surface, at least part of the colour filter has one of: a V-shape outline, a U-shape outline, or a bell shape outline.

8. The electrowetting display device according to claim 1, wherein, in a plane substantially parallel to a plane of the surface, the colour filter comprises:
 a first part having a first dimension with a first magnitude which decreases in a direction away from an edge side of the colour filter; and
 a second part having a second dimension with a second magnitude which is substantially uniform in the direction away from the edge side of the colour filter, the first dimension substantially parallel to the second dimension.

9. The electrowetting display device according to claim 8, wherein the first part of the colour filter adjoins the second part of the colour filter where the first magnitude is greatest, the second magnitude substantially equal to a greatest magnitude of the first dimension.

10. The electrowetting display device according to claim 1, the first fluid at least partially in contact with the second fluid at an interface, wherein, in a plane substantially parallel to a plane of the surface, a part of the colour filter with a smallest magnitude of a dimension of the colour filter substantially overlaps one of:
 a side of the surface in contact with a wall of the support plate, or
 a line along which the first fluid, the second fluid and the surface contact each other, which line corresponds to a configuration of the first fluid and the second fluid with the first fluid substantially fully retracted.

11. The electrowetting display device according to claim 1, wherein, in a plane substantially parallel to a plane of the surface, a magnitude of a dimension of the transmissive region decreases in a direction away from an edge side of the transmissive region.

12. The electrowetting display device according to claim 1, the first fluid at least partially in contact with the second fluid at an interface, wherein, in a plane substantially parallel to a plane of the surface, a magnitude of a dimension of the transmissive region decreases in a direction away from an edge side of the transmissive region, the interface retractable towards the edge side in dependence on the magnitude of the voltage.

13. The electrowetting display device according to claim 1, wherein, in a plane substantially parallel to a plane of the surface, the transmissive region comprises:
 a first part having a first dimension with a first magnitude which decreases in a direction away from an edge side of the transmissive region; and
 a second part having a second dimension with a second magnitude which is substantially uniform in the direction away from the edge of the transmissive region, the first dimension substantially parallel to the second dimension.

14. The electrowetting display device according to claim 13, wherein the first part of the transmissive region adjoins the second part of the transmissive region where the first part of transmissive region has a greatest first magnitude of the first dimension.

15. The electrowetting display device according to claim 1, wherein, in a plane substantially parallel to a plane of the surface, a magnitude of a dimension of at least part of the colour filter decreases in a direction away from an edge side of the colour filter and a magnitude of a dimension of at least part of the transmissive region increases in the direction.

16. The electrowetting display device according to claim 15, wherein the direction is substantially perpendicular to the edge side of the colour filter.

17. The electrowetting display device according to claim 1, comprising a further colour filter configured to filter at least one wavelength from the input light to output, from the further colour filter, light with a different predetermined hue than the predetermined hue.

18. The electrowetting display device according to claim 17, wherein the further colour filter is in contact with the colour filter and in a plane substantially parallel to a plane of the surface, a magnitude of a dimension of at least part of the further colour filter decreases in a direction away from an edge side of the colour filter.

19. The electrowetting display device according to claim 1, wherein at least one of: a shape of, a concentration of a colour filter material of, a thickness of, or an area of, the colour filter corresponds with a pre-determined colour gamut of the electrowetting display device.

20. An apparatus comprising:
 an electrowetting display device comprising:
  a support plate;
  a first display element comprising:
   a first surface of the support plate;
   a first fluid in contact with the first surface;
   a second fluid immiscible with the first fluid;
   a first colour filter configured to filter at least one wavelength from input light to output, from the first colour filter, light with a predetermined hue, the first colour filter overlapping a first part of the first surface;
   a first transmissive region overlapping a second part of the first surface the first transmissive region transmissive for light of the at least one wavelength; and
   a first electrode associated with the first surface for use in application of a voltage to control a configuration of the first fluid and the second fluid,
   the configuration of the first fluid and the second fluid being switchable, in dependence on a magnitude of the voltage, between:
    a first configuration with:
     the first fluid in contact with a first surface extent of the first surface, and
     the first fluid overlapping a first colour filter extent of the first colour filter and a first transmissive region extent of the first transmissive region, and
    a second configuration with:
     the first fluid in contact with a second surface extent of the first surface, and
     the first fluid overlapping a second colour filter extent of the first colour filter and a second transmissive region extent of the first transmissive region,
 at least one processor; and
 at least one memory comprising computer program instructions, the at least one memory and the computer program instructions operable to, with the at least one processor, control the electrowetting display device.

21. The apparatus according to claim 20, wherein the predetermined hue is a red hue, the apparatus further comprising:
a second display element comprising:
  a second surface of the support plate;
  a first fluid in contact with the second surface;
  a second fluid immiscible with the first fluid in contact with the second surface;
  a second colour filter configured to filter at least one wavelength from the input light to output, from the second colour filter, light with a green hue, the second colour filter overlapping a first part of the second surface; and
  a second electrode associated with the second surface for use in application of a voltage to control a configuration of the first fluid and the second fluid of the second display element;
a third display element comprising:
  a third surface of the support plate;
  a first fluid in contact with the third surface;
  a second fluid immiscible with the first fluid in contact with the third surface;
  a third colour filter configured to filter at least one wavelength from the input light to output, from the third colour filter, light with a blue hue, the third colour filter overlapping a first part of the third surface; and
  a third electrode associated with the third surface for use in application of a voltage to control a configuration of the first fluid and the second fluid of the third display element;
a fourth display element comprising:
  a fourth surface of the support plate;
  a first fluid in contact with the fourth surface;
  a second fluid immiscible with the first fluid in contact with the fourth surface;
  a fourth colour filter configured to filter at least one wavelength from the input light to output, from the fourth colour filter, light with a yellow hue, the fourth colour filter overlapping a first part of the fourth surface; and
  a fourth electrode associated with the fourth surface for use in application of a voltage to control a configuration of the first fluid and the second fluid of the fourth display element;
wherein at least one of the second display element, the third display element or the fourth display element comprises respectively at least one of a second transmissive region, a third transmissive region or a fourth transmissive region overlapping a respective second part of at least one of the second surface, the third surface or the fourth surface and transmissive for light of the at least one wavelength filtered by the respective at least one of the second colour filter, the third colour filter or the fourth colour filter; and
wherein, for at least one of the first display element, the second display element, the third display element or the fourth display element, at least one of:
  a shape of, a concentration of a colour filter material of, a thickness of, or an area of, a respective at least one of the first colour filter, the second colour filter, the third colour filter or the fourth colour filter independently corresponds with a pre-determined colour gamut of the electrowetting display device.

22. The apparatus according to claim 21, wherein the second colour filter overlaps substantially all of the second surface, including the first part of the second surface of the support plate.

23. The apparatus according to claim 21, wherein the fourth display element comprises a further colour filter configured to filter at least one wavelength from the input light to output, from the further colour filter, light with a green hue.

24. The apparatus according to claim 21, wherein, in a plane substantially parallel to a plane of the surface, a size of an area of the third transmissive region of the third display element is approximately twice a size of an area of the fourth transmissive region of the fourth display element.

25. The apparatus according to claim 21, comprising:
a pixel comprising the first display element, the second display element, the third display element and the fourth display element,
the at least one memory and the computer program instructions operable to, with the at least one processor:
  receive input data indicative of a display effect for the pixel to display, the input data comprising:
    red channel data indicative of a luminance of a red hue component of the display effect;
    green channel data indicative of a luminance of a green hue component of the display effect; and
    blue channel data indicative of a luminance of a blue hue component of the display effect;
  calculate, from the luminance of the red hue component, the luminance of the green hue component and the luminance of the blue hue component, a yellow hue component of the display effect; and
  generate output data indicative of the display effect for the pixel to display, the output data comprising:
    output red channel data indicative of a configuration of the first fluid and the second fluid of the first display element for displaying the red hue component of the display effect;
    output green channel data indicative of a configuration of the first fluid and the second fluid of the second display element for displaying the green hue component of the display effect;
    output blue channel data indicative of a configuration of the first fluid and the second fluid of the third display element for displaying the blue hue component of the display effect; and
    output yellow channel data indicative of a configuration of the first fluid and the second fluid of the fourth display element for displaying the yellow hue component of the display effect.

* * * * *

UNITED STATES PATENT AND TRADEMARK OFFICE
CERTIFICATE OF CORRECTION

PATENT NO. : 9,740,000 B2
APPLICATION NO. : 14/580761
DATED : August 22, 2017
INVENTOR(S) : De Greef Page 1 of 1

It is certified that error appears in the above-identified patent and that said Letters Patent is hereby corrected as shown below:

In the Claims

In Column 21, Line 52, in Claim 12, delete "interface" and insert -- interface being --, therefor.

In Column 21, Line 63, in Claim 13, delete "edge" and insert -- edge side --, therefor.

In Column 22, Line 2, in Claim 14, delete "of transmissive" and insert -- of the transmissive --, therefor.

In Column 22, Line 20, in Claim 18, delete "and in" and insert -- and, in --, therefor.

In Column 22, Line 42, in Claim 20, delete "surface the" and insert -- surface, the --, therefor.

Signed and Sealed this
Third Day of April, 2018

Andrei Iancu
*Director of the United States Patent and Trademark Office*